United States Patent Office 3,295,932
Patented Jan. 3, 1967

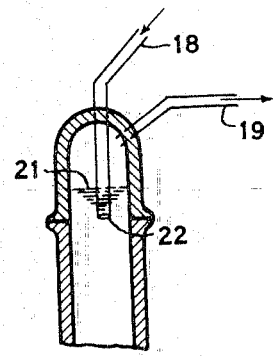
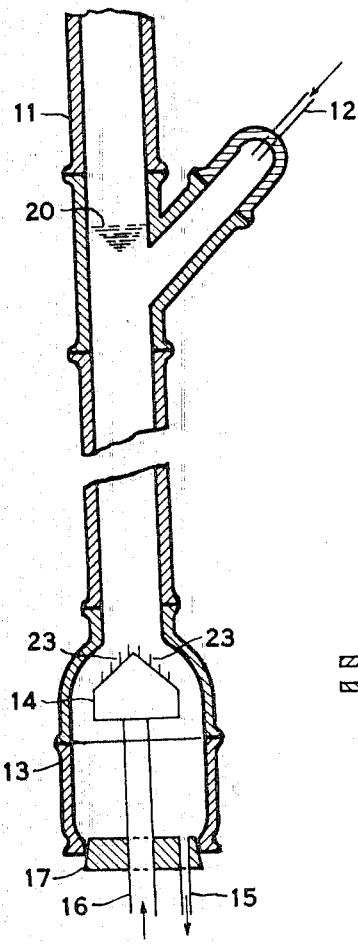
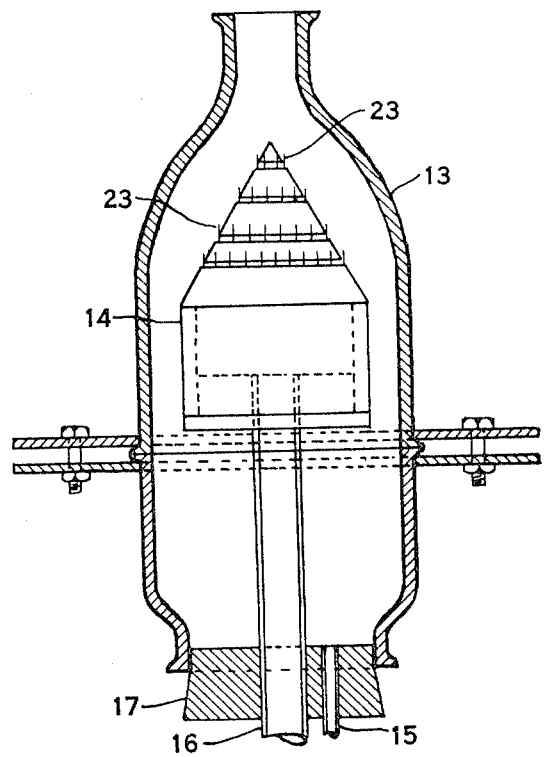
Fig 1
Fig 2

3,295,932
METHOD FOR THE EXTRACTION OF MINERALS
Pierre Boutin, Ottawa, Ontario, and Frank W. Melvanin, Port Hope, Ontario, Canada, assignors to Eldorado Mining and Refining Limited, Ottawa, Ontario, Canada, a company of Canada
Filed Apr. 26, 1963, Ser. No. 275,964
13 Claims. (Cl. 23—340)

The invention deals with the extraction of valuable ingredients from ores by hydrometallurgy. The invention is also equally applicable to the extraction of deleterious substances from ores or potential ores, with the resulting beneficiation or purification of the valuable ingredients.

While the experimental work conducted in the development of the invention (and the apparatus designed to carry out the experiments) was directed particularly to the economic recovery of valuable minerals from what was otherwise waste "tailings" in an extraction plant, the principles of the process and the apparatus can be applied with equal effectiveness to the removal of minor quantities of undesirable substances. The latter procedure can be applied to upgrade a product, or it can be used to produce commercially valuable material from what would otherwise be discarded as waste.

The need for such an economic process has been particularly obvious in the present practice of extracting uranium oxide ($U_3O_8$) from uraniferous ores. The demand for the metal uranium in the past 15 years has led to the erection and operation of hydrometallurgical mills each capable of handling quantities of several thousands of tons daily. In addition, uranium oxide is extracted as a by-product at such locations as the large gold mills of the Republic of South Africa. Such has been the demand for uranium that direct extraction has been carried out on ores originally containing as low as 0.10% $U_3O_8$; and the by-product plants accept as feed material, ores containing substantially lesser quantities of uranium oxide.

Understandably, when dealing with such minor physical quantities of the valuable substance disseminated throughout large physical volumes of waste material, a great amount of research has been devoted to the problem of recovering as high a percentage as possible of the valuable ingredient. Despite these prior efforts, substantial quantities of uranium are being discarded into dumps and tailings ponds because no economic process is available to recover the minor quantities contained therein.

Similarly, manganese deposits remain unworked because the valuable metal occurs in a physical form for which no process has been developed to extract it economically. The ultimate recovery of minor quantities of base metals such as copper, lead, zinc, nickel, that are presently being discarded, is also a field in which an inexpensive process such as described herein is applicable.

It is well known and conventional to recover valuable minerals from their ores by dissolving the mineral and separating the loaded, or "pregnant" solution from the remaining solid material by filtration. Such filtration conventionally takes the form of large mechanical apparatus and associated vacuum-producing equipment. Disc type filters and drum type filters are the most common. However, the capital cost and the operating cost of such filters are substantial items in the total extraction cost in a mineral ore-dressing plant and economies are available if the filtering step can be eliminated. The extraction of minor quantities of dissolved uranium oxide or other minerals by organic solvents is known, but the subsequent loss of the solvent and contamination with solids in the extraction step has made such processes heretofore uneconomic. The invention permits the efficient recovery of the desired mineral, and at the same time, avoids losses of the organic extractant.

The conventional method of recovering uranium oxide from uraniferous ores is to crush and grind the raw material to small particle size, dissolve the mineral in acid, separate the dissolved mineral-loaded solution from the solid rock particles by filtration and separate the dissolved mineral from the solution. The mineral-laden solution can also be extracted with the use of an organic solvent whereby the pregnant fluid in the mixture of fluid and crushed rock—"slurry"—is treated directly with the organic solvent to transfer the mineral values from the aqueous phase to the organic phase. In this latter step it has not been possible in the past to avoid the economically-prohibitive loss of the organic solvent in the stripped slurry. Agitators to promote the solution, and settler tanks and filters for the separation of the fluids from the solids, have been used previously, but all of the solvent has not been recovered from the slurry. An economical method of separating the dissolved mineral from the slurry has now been developed and is described in detail below.

It is the object of this invention to provide a method and apparatus to separate dissolved mineral from leached ore slurry.

The process developed consists of separating the mineral-laden solution from the slurry by extracting it into a fluid organic extractant. The slurry flows vertically downward in the vessel by means of admitting the slurry at the top and removing it from the bottom. The organic extractant is introduced at the bottom of the vessel in the form of globules having a minimum diameter of 0.1 millimetre and these globules by reason of the lesser density of the extractant rise vertically through the slurry and countercurrent to its flow. The globules extract the mineral solution from the slurry and collect above the slurry where they are led off and the mineral and the organic extractant are recovered.

While certain organic extractants are available for the extraction of uranium, other organic extractants are also available for the extraction of most metals. These can be used according to the invention for the treatment of various ores or slags. Gold and sulphur can be extracted by our process.

We have now found that the extractant losses are due to the formation of small globules of the organic phase in the aqueous phase. These small globules of organic extractant attach themselves to the solid matter in the slurry and do not rise and separate from the aqueous phase into the organic phase. The organic extractants for the most part have a specific gravity of less than 1.0 and thus there is a significant difference in the density between the pregnant extractant and the slurry. Where the volume of a globule is small, the difference in density between the globules coated with small solid particles and the slurry mixture itself prevents the globules attaining a velocity sufficient to allow them to rise and to separate, and hence, they are lost in the discharged barren slurry. We have determined by means of photomicrographs of the slurry discharge that substantially all of the extractant globules therein have a diameter of less than 0.1 millimetre.

The loss of these small globules entails a loss of mineral values as well, but these are not great because of the relatively minor volume of the extractant. However, the total recovery of the extractant for re-cycling in the process is essential to economical feasibility of the process and the prevention of this loss of extractant is critical. We have also determined that organic extractant globules of a size greater than 0.1 millimetre in diameter have sufficient buoyancy even when the difference in specific gravity of the solvent and aqueous phase is as low as 0.02 and, even when coated with small solid particles to rise through a slurry and separate from the aqueous phase into an organic phase layer above the aqueous phase.

The extractant collection just above the aqueous phase of the slurry will often contain considerable solids that have been carried upwards with the globules. The collected mixture forms a "crud," which is defined as a mixture of organic extractant and solids in a grease-like phase. While it is possible to separate the extractant from the solids in the crud in a separate step, it is usually desirable to insert an aqueous "washing" zone above the slurry, through which the solid-coated extractant globules rise. The effect of the washing zone is to strip the slurry containing solid particles from around the globules and allow the clean extractant globules to collect above the aqueous phase as an organic phase substantially free of solids. This organic phase contains the extracted mineral and is led off to be treated for the separation of mineral values and to recover the organic extractant for re-use.

Organic solvents are known and available for most metallic minerals, and the amines and the organo-phosphates are particularly suitable. Tertiary amines such as tri-n-octyl amine, tricaprylyl amine sulphate, and tributyl phosphate have been tested and proved efficient in dissolving acid-leached uranium minerals. These solvents are known to dissolve phosphorus also. The actual organic solvent is not an essential part of the invention because such solvents are known for most mineral-bearing solutions.

Polar organic compounds may be used as extractants to complex or form water-insoluble salts with the ions to be extracted. Suitable polar compounds including primary, secondary and tertiary amines, amine salts including quaternary ammonium salts, organo-phosphates such as tributyl phosphate and other liquid ion exchangers.

The organic extractants desirably may comprise water-insoluble organic diluents of low specific gravity. Suitable diluents include kerosene, normal-hexane and other aliphatic hydrocarbons including halogenated hydrocarbons. These diluents are normally less expensive than the amines, amine salts, or other organic polar compounds and may also have the effect of lowering the specific gravity of the extractant (preferably to less than 1.0) so that the bubbles rise rapidly through the ore slurry and readily cross the aqueous-organic interface. The difference in specific gravity between the organic phase and the aqueous phase should be at least 0.02—preferably as much as 0.2 or more.

The invention may be more clearly understood by reference to the drawing, in which:

FIGURE 1 illustrates in section a vertical column providing an inlet and an outlet for the slurry, a bubbler for introducing the extractant, and an outlet for the extractant; and FIGURE 2 illustrates in section the design of an extractant bubbler that has proved very effective.

In FIGURE 1, the vertical column 11 is fitted with a slurry inlet tube 12 located in the upper part of the column. The bottom of the column is fitted with an assembly 13, made up of a bubbler 14, and the slurry outlet tube 15. The slurry outlet tube 15 and the bubbler inlet tube 16 enter through the stopper 17. The top of the column 11 is fitted with a wash inlet 18 and a pregnant extractant discharge tube 19.

The slurry is pumped in through tube 12 and discharges through tube 15. Washing medium is introduced through tube 18 and the slurry-wash interface 20 exists immediately above the point of entry of the slurry into the column. The top level of the washing medium is maintained near the top of the column at 21. This level must be maintained above the orifice 22 of the wash solution inlet tube 18. The wash feed, the slurry feed and the slurry discharge are regulated by pumps (not shown) to maintain the desired levels and flow rates and these regulatory steps are well known in the art.

The organic extractant is introduced into the bottom of the column through the inlet tube 16 and the bubbler 14. The bubbler 14 is fitted with needles 23 of a size that release bubbles not less than 0.1 millimetre in diameter. No. 22 surgical needles provide extractant bubbles of approximately 1.8 millimetres in diameter. This type of needle has proved particularly effective in releasing only bubbles of a preferred size without releasing smaller "trailer" bubbles at the same time. The problem of the small trailer bubbles was encountered with other bubbler designs. There is no defined maximum bubble size. The upper size limit is determined by the desired extraction rate, flow rates, apparatus size, etc. Our experiments have indicated an optimum bubble size in the neighborhood of 1.8 mm. (i.e. 1.5–2.0 mm.). This bubble size avoids extractant losses in the slurry discharge and permits rapid extraction of the dissolved mineral.

However, the details of the bubbler are not essential to the invention and other designs involving a series of orifices or the like, are quite feasible. The orifices should be spaced horizontally and/or vertically at least one bubble diameter to avoid coalescence.

The globules of organic extractant emitting from the needles 23 rise vertically countercurrent to the flow of the slurry because of the difference in density between the extractant and the slurry, and also because of the difference in density between the extractant and the washing medium. In passing upwards through the downwardly flowing slurry, the extractant absorbs the mineral values from the slurry. In addition, during the upward passage of the globules, solid particles from the slurry attach themselves to the surface of the globules and solids collect with the globules above the slurry level 20.

As stated previously, it is possible to lead off the pregnant extractant-plus-solids at this stage and to separate the fluids from the solids before separating the mineral values. However this separation of fluids from solids can more desirably be accomplished by a washing zone located above the slurry. In the wash zone, the globules continue to rise vertically and the slurry containing solid particles enveloping the surface of the globules is removed and flows downwardly with the washing solution. The globules are thus cleansed of solids and they rise through the upper surface 21 of the wash solution and collect at the top of the column. This non-aqueous pregnant organic phase is led off through tube 19 for further treatment to separate the mineral values and to return the stripped extractant to the extractant supply. In some instances, particularly if no washing zone has been used, the volume of crud at the aqueous-organic interface may increase to objectionable proportions unless it is removed or its formation prevented. We have found that the formation of this crud can be prevented by the application of sonic vibrations to the slurry zone or washing zone at or near the aqueous-organic interface. One suitable apparatus is that designated Dynasonics Model G 5001 having two titanate transducers operating at 40 kilocycles. A similar device is manufactured by Bransom Ultrasonics Corp., Stamford, Connecticut, U.S.A. The transducers were immersed in water in a separate tank surrounding the washing zone and near the aqueous-organic interface. However the transducers may be inserted directly in the washing zone. A substantially clear organic phase has been obtained without resorting to such vibrations and they are not considered essential.

FIGURE 2 is an enlarged view of a bubbler design in which the needles 23 project vertically upwards from the sloping surfaces of the cone 14. This arrangement of the needles assists in preventing the solid particles in the slurry from lodging around the base of the needles and from eventually building up to cover the upper ends of the needles which would suppress the flow of globules. An effective spacing of outlets is also attained.

The dimensions of a column required to absorb the mineral values into the extractant and to wash the globules clear of solid particles will vary according to the volume of slurry, the volume of extractant, the volume of washing medium, and the desired extraction rate and flow rate. The speed with which the extractant globules rise through the slurry must provide sufficient time for each organic globule to absorb its full capacity of mineral.

*Example*

A design that has proved effective in carrying out the invention consists of a column 50 feet high. Extractant discharge 19 leads off from the top of the column and the wash solution inlet 18 establishes the aqueous-organic interface just below the top of the column. The slurry inlet is fixed at about the 45-foot level and the bubbler is fitted with 36 No. 22 surgical needles.

A typical operation in a column having an internal diameter of one inch has the slurry feed consisting of 60% solids. The slurry feed is combined with the washing solution to flow at a rate of 1000 millilitres per minute per square inch, and these two solutions are combined to provide a diluted slurry containing 35% solids. To maintain the desired level of the top of the washing solution 1000 millilitres per minute per square inch are pumped out of the slurry discharge tube 15. The organic extractant globules 1.8 millimetres in diameter flow upward from the bubbler through 36 needles at a rate of 190 millilitres per minute per square inch.

In actual operation on a uranium ore in which the uranium oxide values had been put into an aqueous sulphuric acid solution, the invention operated under the following conditions and produced the following results:

Ore—pitchblende from Lake Athabasca area of Alberta containing 0.2% $U_3O_8$, ground to:
    2.4% +65 mesh
    67.0% −200 mesh
Slurry feed—
    60% solids
    pH—1.5
    $U_3O_8$—3.2 grams per litre
Washing solution—0.2 N sulphuric acid
Mixed slurry and wash—
    34% solids
    Density 1.3
Extractant—
    0.1 M tricaprylyl amine sulphate dissolved in kerosene 1:4 by volume
    Density 0.8
Extractant content—$U_3O_8$ 3.5 grams per litre
$U_3O_8$ recovery—99.8%
Extractant losses—less than 0.02 gallon amine per ton of solids treated
Slurry discharge—$U_3O_8$—0.002 grams per litre The pH of the washing solution is not critical—plain water might have been used. Alkaline-leached slurries are also known and an alkaline washing solution could be used with them to avoid disturbing the pH already established. In some systems the pH may affect the extraction equilibrium and should be controlled accordingly.

The percentage of solids in the treated slurry is not critical, but consideration must be given to the even-flow and non-clogging characteristics in the passage of the slurry through the equipment. Solids in excess of 45% in the slurry created difficulties in a one-inch diameter column. The slurry feed concentration of solids would also have to be lessened if the washing solution was not available as a diluent.

As shown in this example, the economic efficacy of this invention lies in the almost total recovery of both the mineral values and the organic solvent.

Table I indicates various metals found to be greater than 50 percent extracted into the extractant-solvents listed. The metals were dissolved in a sulphuric acid solution (100 gm./litre) to a concentration of 5 gm./litre.

Chromium, nickel, zinc, and copper were not extracted by the extractants in Table I.

TABLE I

| Extractant* | Metal Extracted | | | | |
|---|---|---|---|---|---|
| | Be | V | Co | Zr | Mo |
| 1. Tertiary-alkyl mono-amines (primary) | | X | | | X |
| 2. Aliphatic secondary amine mixture | | | X | | X |
| 3. Triisooctylamine | X | X | | X | X |
| 4. Tricaprylylamine | X | | X | X | X |
| 5. Methyl-tricapryl-ammonium chloride | | | | X | |

*Mixed 1.4 by volume with kerosine diluent giving a specific gravity of about 0.9.
  1. Rohm and Haas "JMT."
  2. Rohm and Haas "9D178" (unsaturated aliphatic secondary mono-amines—M.W. 351–393, $C_{11}$–$C_{14}$).
  3. Union Carbide Corp.
  4. General Mills Alamine 336 (av. M.W. 392, $C_8$–$C_{10}$).
  5. General Mills Aliquat 336.

Other metals, metalloids, and soluble impurities may be similarly separated by appropriate selection of other organic extractants. The process is also applicable to the separation of uranium from plutonium and fission products in spent fuel elements (e.g. Purex-type process). Operation normally is carried out near room temperature although the temperature can be varied for different systems. It is not intended to limit the invention to the metals and extractants specifically illustrated.

What we claim is:

1. The method of separating a dissolved mineral from a comminuted mineral solids-and-water mixture wherein the said mineral is extracted into a fluid organic extractant, comprising flowing the said mixture vertically downwardly, introducing the said extractant in the form of globules having a minimum diameter of 0.1 millimetres and substantially free of globules of less than said minimum diameter into the bottom of the said downwardly flowing mixture, causing substantially all of the said globules to rise vertically countercurrent through the said downwardly flowing mixture to extract the said mineral, and collecting and recovering the extractant and the mineral.

2. The method of claim 1 wherein the said dissolved mineral contains one of the group consisting of uranium, manganese, phosphorus, gold and sulphur.

3. The method of claim 1 wherein the said extractant contains one of the group consisting of amines, amine salts, and organo-phosphates.

4. The method of separating a dissolved mineral from a comminuted mineral solids-and-water mixture wherein the said mineral is extracted into a fluid organic extractant, comprising flowing the said mixture vertically downwardly, maintaining a downwardly flowing aqueous washing medium above the said downwardly flowing mineral solids-and-water mixture, introducing the said extractant in the form of globules having a minimum diameter of 0.1 millimetres into the bottom of the said downwardly flowing mixture, causing the said globules to rise vertically countercurrent through the said downwardly flowing mixture to extract the said mineral, causing the said globules to rise vertically further through and collect above the said washing medium, and collecting and recovering the said extractant and the said mineral.

5. The method of claim 4 wherein the said dissolved mineral contains one of the group consisting of uranium, manganese, phosphorus, gold, and sulphur.

6. The method of claim 4 wherein the said extractant contains one of the group consisting of amines, amine salts, and organo-phosphates.

7. The method of claim 4 wherein the said extractant has a specific gravity of at least 0.02 unit lower than the specific gravity of the said aqueous washing medium.

8. The method of claim 4 wherein the said introduced extractants has a specific gravity between 0.60 and 0.90.

9. The method of claim 4 wherein the said globules are in the preferred size range of 1.5 to 2.0 millimetres.

10. The method of claim 4 wherein solid particles passing upwardly through the aqueous washing medium are caused to settle by the application of ultrasonic vibrations.

11. The method of separating a dissolved uranium mineral from a comminuted mineral solids-and-water mixture wherein the said uranium mineral is extracted into a fluid organic extractant selected from the groups consisting of tricaprylyl amine sulphate and tributyl phosphate in an aliphatic hydrocarbon diluent, comprising flowing the said mixture vertically downwardly, maintaining a downwardly flowing aqueous washing medium above said downwardly flowing mineral solids-and-water mixture, introducing the said extractant in the form of globules having a minimum diameter of 0.1 millimetre into the bottom of said downwardly flowing mixture, causing the said globules to rise vertically countercurrent through the said downwardly flowing mixture to extract the said uranium mineral, causing the said globules to rise vertically further through and collect above the said washing medium, and collecting and recovering the said extractant and the said mineral.

12. The method of claim 11 wherein the said introduced extractant has a specific gravity between 0.60 and 0.90.

13. The method of claim 11 wherein the slurry resulting from the intermixing of the said comminuted mineral solids-and-water mixture and the said downwardly flowing aqueous washing medium contains approximately 35% solids.

References Cited by the Examiner
UNITED STATES PATENTS

| | | | |
|---|---|---|---|
| 2,364,892 | 12/1944 | Elgin | 23—310 |
| 2,990,254 | 6/1961 | Winter et al. | 23—270.5 |
| 3,052,513 | 9/1962 | Crouse | 23—14.5 |
| 3,083,076 | 3/1963 | Drobnick et al. | 23—14.5 |
| 3,085,864 | 4/1963 | Jealous | 23—270.5 |

OTHER REFERENCES

AEC Document AECU–3181, April 1956, pp. 1–5.
AEC Document AECU–3367, September 1956, p. 13.
Honekamp et al., Industrial and Engineering Chemistry, Process, Design, and Development. Vol. 1, No. 3, pages 176–184, July 1962.

L. DEWAYNE RUTLEDGE, *Primary Examiner.*

CARL D. QUARFORTH, REUBEN EPSTEIN,
*Examiners.*

J. D. VOIGHT, S. TRAUB, *Assistant Examiners.*